May 7, 1935. C. S. McCHESNEY 2,000,452
INFLATED ARTICLE AND METHOD OF MAKING THE SAME
Original Filed Dec. 29, 1931
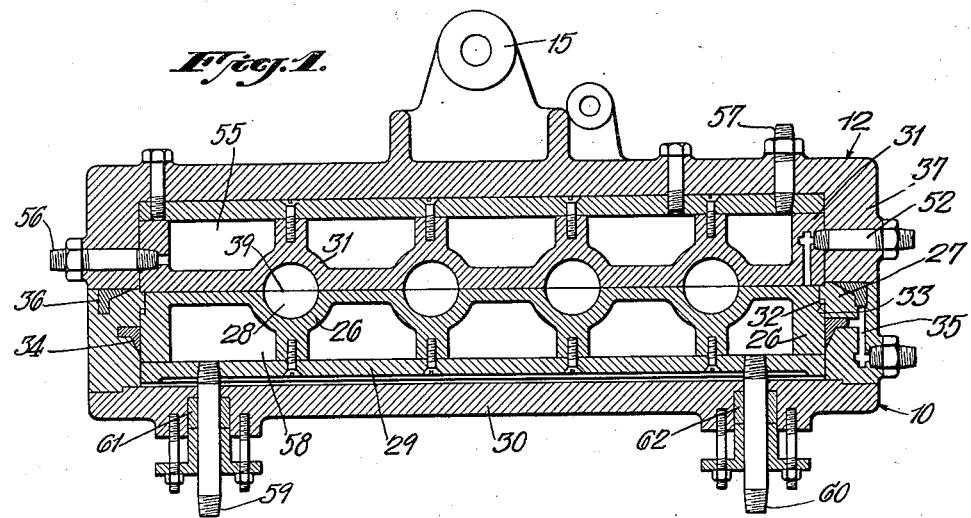
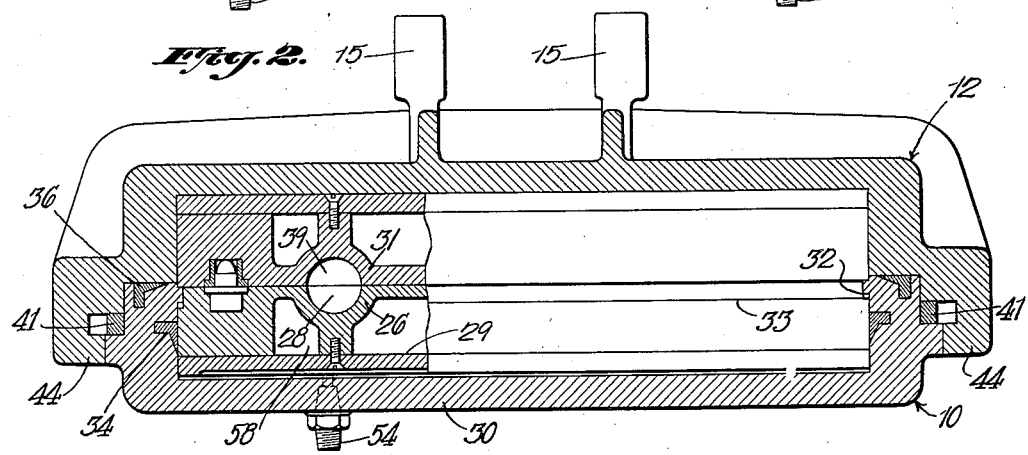
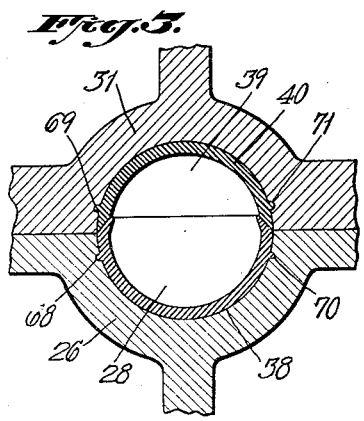
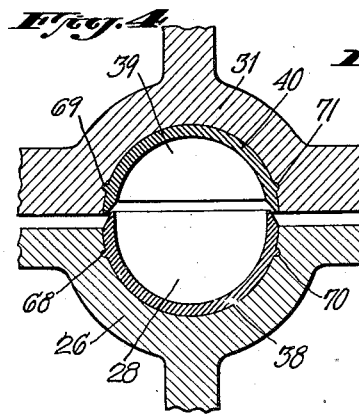
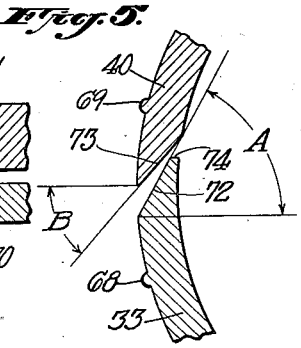
INVENTOR
CUYLER S. McCHESNEY.
BY
ATTORNEYS Patented May 7, 1935

2,000,452

UNITED STATES PATENT OFFICE 2,000,452

INFLATED ARTICLE AND METHOD OF MAKING THE SAME

Cuyler S. McChesney, Kenmore, N. Y., assignor to Dunlop Tire and Rubber Corporation, Buffalo, N. Y., a corporation of New York Original application December 29, 1931, Serial No. 583,640. Divided and this application February 16, 1934, Serial No. 711,453

5 Claims. (Cl. 18—55)

The present invention is a division of co-pending application Serial No. 583,640 filed December 29, 1931.

My invention relates to the manufacture of inflated articles such as tennis or other balls, the interior space of which is filled with a gas under a pressure. It relates to constructions enabling a more perfect sealing of the walls of the article to be obtained and provides means for effectively forming and filling the article with gas under pressure in an inexpensive, simple manner.

Inflated balls and similar articles have heretofore been filled with gas under pressure by inserting a hollow needle into the ball through which the gas under pressure is supplied and then sealing the wall of the ball, or in placing within the ball a material that decomposes to a gas during the curing or vulcanization. Each of these methods has certain disadvantages. The balls may also be filled with gas under pressure when formed of two halves by joining these halves in an atmosphere of gas under pressure, and then curing. This latter method, however, is difficult and troublesome to carry out and is usually wasteful of gas.

Objects of my invention are to avoid the objections and disadvantages in the previous methods of forming and inflating hollow articles, and to provide a method in which the balls or other articles may be formed of halves or parts while the inner spaces of said parts are filled with any desired gas under pressure, and in which the parts or halves are then joined substantially without the use of gas other than that supplied to said interior spaces; and further, to provide apparatus in which the parts to be joined may be easily and readily placed in position for joining and may be held properly positioned in the apparatus during the joining of the parts.

A further object of the invention is to provide article parts or halves suitably shaped readily to form a seal of the greatest tightness against escape of gas and to be easily placed and held in proper position in apparatus of the above type, and to form a finished ball or hollow article having a more perfect seal where the various parts, of which the ball or article is formed, are joined.

With these and other objects in view which will more fully appear from the following description, the invention resides in the article and methods described and pointed out in the following specifications and claims.

The various features are illustrated in the accompanying drawing, in which—

Fig. 1 is a vertical sectional view of molds and holding parts or retainers thereof suitable for carrying out the method of my invention.

Fig. 2 is a section of the molds and retainers taken on a plane at right angles to that of Fig. 1, the mold parts being shown partly in section and partly in side elevation.

Figs. 3 and 4 are detail sectional views of a portion of a mold and of a ball positioned therein shown respectively in closed and slightly opened positions.

Fig. 5 is a detail sectional view on a somewhat enlarged scale of two halves or parts of an article about to be joined.

In my invention a pair of molding elements or mold halves containing recesses to form one or more articles are mounted in corresponding retainers or retainer shells in an apparatus whereby these retainers and the mold halves or elements may be brought into complementary closed relationship so that the retainer parts or shells form a completed chamber. One of the mold parts is movable within its respective retainer or shell to leave a slight space between its face and the opposed face of the other mold part and is sealed against the sides of the retainer or shell so that this space between the mold halves is sealed against communication with the shell or retainer outside of the mold part.

The gas with which the articles are to be inflated is supplied to this enclosed sealed space between the mold halves under pressure at which the articles are to be inflated so that the space within the mold cavities, and which contains the parts to be joined to form the article, is filled with the desired gas at the desired pressure. Thereupon the movable mold half is forced toward the opposite mold until their adjacent faces meet and seal the mold cavities, containing the mold halves, to form the completed article, this sealing, therefore, taking place while the article halves are inflated with the gas at the desired pressure. As the mold parts are forced together, all excess gas is expelled back through the supply pipe. The mold halves are then heated by steam, or other suitable means, until the parts are cured, whereupon the molds are cooled and opened, the gas supply pipe meanwhile having been closed. The mold retainers or shells may then be opened and the completed articles taken from the molds.

The mold retainers or shells are so mounted and formed that when opened they are swung to position to enable the article halves to be readily placed in proper position in the mold sections and to be positively and accurately held in position for joining when the molds are closed.

This is accomplished by interfitting beads and recesses on the article halves and mold receptacles, respectively.

To ensure a proper sealing and joining of the article halves during the above operations, one of the halves is provided with a beveled edge sloping inwardly to provide an acute outer edge. The other half is also beveled but in the opposite direction, but with such an angle that it intersects the beveled edge of the first part when the two parts or halves are forced together. In this manner it is forced more tightly against the beveled edge of its complementary part and forms a more positive, firmer seal therewith.

Referring more particularly to the apparatus illustrated in Figs. 1 and 2 of the accompanying drawing, in shell 10 or retainer is mounted a mold half or part 26. The edge of this mold, which may be of circular or other shape, fits the inner surface of the side wall 27 of the mold retainer or shell 10 and has an exposed surface spanning the area within the side walls 27 and provided with a number of semi-spherical recesses 28 of dimensions corresponding to the size of the balls to be formed.

The mold part 26 is slidably mounted in the retainer 10 so that it may slide downwardly therein until its lower wall 29 contacts with, and is stopped by, the bottom wall 30 of the retainer 10, this movement, however, being a relatively slight one. It may move outwardly of the retainer 10 until its front or exposed face contacts with a face of a complementary mold 31 in the upper retainer 12. The mold 31 may be, and preferably is, mounted in fixed position in the retainer 12. The outward movement of the mold 26 may also be restrained by a shoulder 32 on the inner edge or surface of the wall 27 which fits into a corresponding niche 33 in the mold part 26.

The space between the rear walls 29 and 30 of the mold part 26 and retainer 10, respectively, is sealed from the front face of the mold in such a manner that fluids supplied under pressure to either of the above faces cannot escape to the other. This is preferably accomplished by a circumferential packing 34 set into a recess in the side wall 27 of the retainer shell 10. This packing may be pneumatically pressed toward the wall of the mold half 26 by fluid pressure supplied through a duct 35 to the channel surrounding the packing 34. A similar packing 36 is provided in the edge of the wall 27 that contacts with the corresponding circumferential wall 37 of the upper shell or retainer 12 so that when these two parts are brought together, a tight seal may be made between them.

When the apparatus is in open or charging position, each recess 28 in the lower mold part 26 is filled with a hollow hemi-spherical half or section of rubber as indicated at 38 in Figs. 3 and 4. Corresponding or complementary hemi-spherical recesses 39 in the upper mold part 31 are accessible to the operator when the parts are opened and separated, and are similarly supplied with hollow hemi-spherical sections or halves 40. When all of the mold has thus been supplied with hemi-spherical parts, the parts 10 and 12 are placed in closed position as shown in Figs. 1 and 2.

During or prior to closing, the mold half 26 will be resting on the lower wall 30 of the lower mold retainer or shell 10 so that the opposing faces of the mold halves 26 and 31 do not abut but are slightly spaced, as indicated in Fig. 4 of the drawing. The edges between the hemispherical halves 38 and 40 to be joined to the completed article are also slightly spaced, as shown in Fig. 4, giving access between the interior of these parts and the space between the opposing faces of the mold halves 26 and 31.

The mold retainers or shells 10 and 12 are thereupon tightly locked in position as described in application Serial No. 583,640. When the mold shells have been locked in closed position, fluid under pressure is admitted through the duct 35 to the packings 34 and 36, causing the latter to tightly seal the edge walls of the lower mold part 26 and the abutting edges of the mold shells or retainers 10 and 12, respectively.

A supply of gas with which the articles are to be filled, and under the pressure at which they are to be filled, is then admitted through a supply pipe 52 to a duct 53 in the upper mold part 31 which leads to the space between these two mold parts. This space, as indicated at 54 in Fig. 4, and also the space within the two hemi-spherical halves 38 and 40, are thus filled with gas at the desired pressure. Thereupon the lower mold part 26 is forced against this pressure, upwardly into close contact with the upper mold part 31, bringing the two opposed faces of the molds tightly together and eliminating the space 54.

The gas contained in this space is thereby forced back through the duct 53 into the supply pipe 52 so that there remains in the apparatus only the gas within the hemi-spherical halves 38 and 40. The mold half 26 may be forced upwardly by any suitable means as, for example, by fluid under greater pressure than that supplied through the pipe 52, and admitted through the inlet pipe 54, Fig. 2, between the wall 29 of the lower mold part 26 and the wall 30 of the retainer shell.

The articles are now completely assembled and inflated. Steam is then admitted to steam chambers 55 in the mold through pipes 56 and 57 and is also admitted to steam chambers 58 in the movable mold 26 through pipe connections 59 and 60 which are threaded into the mold 26 and passed through suitable packings 21 and 62, respectively, in the wall 30 so that these pipe connections may move with the movement of the mold 26.

When the articles have been sufficiently cured, cooling water may be admitted to the steam chambers 55 and 58 through the respective pipe connections 56, 57, 59 and 60. Thereafter the pressure in the supply pipe 54 is released. The pipe 52 is disconnected from the source of gas and connected with air under pressure which thereupon forces the mold 26 away from the mold 31 and back to its original position. Then the pressure on the lines 11 and 12 is released.

To ensure that the two halves 38 and 40 to be molded shall be in their proper position in the mold recesses, the former are provided with beads 68 and 69, respectively, slightly spaced from and parallel to the plane of the edges of these halves, and these beads fit into suitably positioned recesses 70 and 71, respectively, in the surfaces of the mold recesses. When the operator inserts the two halves to be molded into the mold recesses, therefore, the beads 68 and 69 fitting into the recesses 70 and 71, accurately position the halves and also serve to hold them in this position while the molds are being moved into closed position.

It will be understood that any suitable and satisfactory type of joint may be used between the two halves 38 and 40.

In the case of a spherical object or ball, the type of joint shown in Figs. 3, 4 and 5 is very desirable. In this joint the edge of one part 40 is beveled inwardly on an angle to the plane of the edge indicated at B. The edge of the other part is beveled in a complementary direction, but on a larger scale than complementary angle as at A. Inasmuch as the angle A is greater than the angle B, the beveled face 72 of this half will not reach and intersect the inner spherical surface of the part if it be made of the same width as the beveled edge 73 of the part 40. The edge between the beveled face 72 and the inner surface of the part 38 will, therefore, be blunted, as at 74, although this is not strictly necessary, and the edge 72 may extend further toward the inner surface of the sphere than indicated in Fig. 5.

In any event, however, as the two parts are brought together, the edge 74 will strike the tapered surface 73 before the two parts are completely assembled and the tapering edge 72 will, therefore, be forced inwardly against a certain outward resistance. This causes the two edges 72 and 73 to be forced together with a positive sliding friction which presses them into the most intimate contact and with the least amount of cement to hold them together. The pressure within the two parts also acts to press the edges 72 and 73 together, as a certain component of this pressure acts normal to these two surfaces. The above joint is, therefore, especially suited for use in the apparatus.

What I claim is—

1. A hollow resilient wall article formed of two halves joined on a seam, the edge of said seam being inclined to the plane of juncture of said halves so that the edge of one half overlaps the edge of the other, the angle of the overlapped part of the seam being more acute than that of the overlapping edge and being depressed inwardly by the latter.

2. A method of joining two halves of a hollow resilient wall article which comprises placing said articles in complementary slightly spaced positions, filling said halves with a gas under pressure, inclining the complementary edges so that one overlaps the edge of the other and having the overlapped edge more nearly perpendicular to the plane of juncture than that of the overlapping edge so as to intersect the latter and be pressed inwardly thereby as the parts are brought together, and bringing said parts to closed position.

3. A method of molding hollow articles which comprises supporting complementary article parts in spaced positions in a confined space, causing gas to flow from a supply of gas under pressure to fill said space with gas under pressure of said supply, bringing said article parts together to enclose and seal gas under pressure in the hollow article thus formed, and reducing the space about said article to substantially complete elimination to force the gas in said space outside said article back into said supply.

4. A method of molding hollow articles which comprises supporting complementary article parts in spaced positions in a confined space, filling said space with gas under a predetermined pressure, bringing said parts together and sealing them in complementary positions to form a complete whole that encloses gas under pressure while contracting said space to substantially the volume of said completed article.

5. A hollow resilient wall article formed of two halves joined on a seam, the edge of said seam being inclined to the plane of juncture of said halves so that the edge of one half overlaps the edge of the other, the angle of the overlapped part of the seam being more acute than that of the overlapping edge and being depressed inwardly by the latter, each half having a continuous external bead spaced slightly from the seam.

CUYLER S. McCHESNEY.